No. 680,467. Patented Aug. 13, 1901.
W. H. SHOEMAKER.
GRASS CATCHER FOR LAWN MOWERS.
(Application filed Apr. 4, 1900.)
(No Model.) 2 Sheets—Sheet 1.
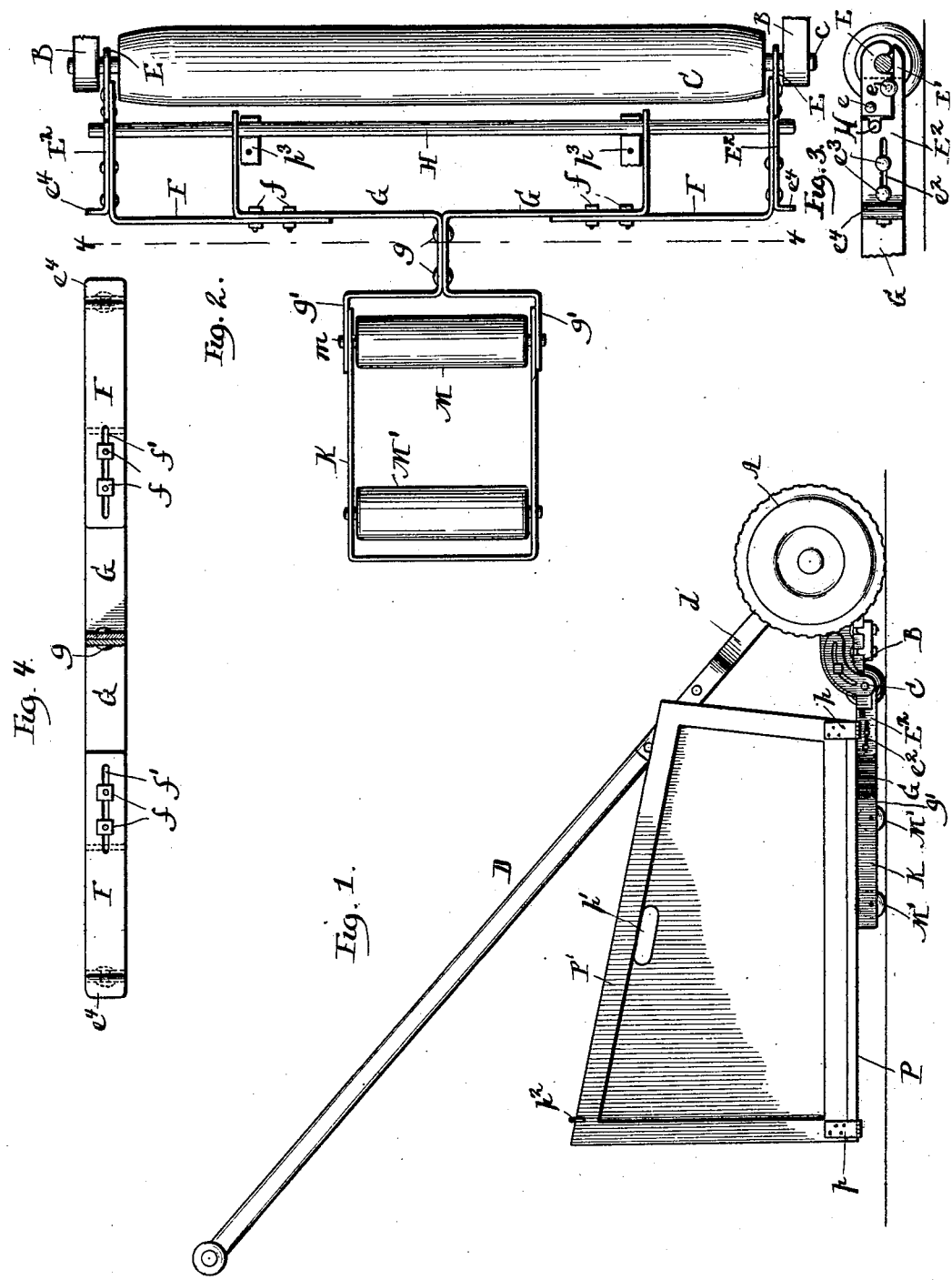
Witnesses:
Fred Gerlach
Alberta Adamick
Inventor:
Wm H. Shoemaker
By Bence Fisher
his Attorneys.

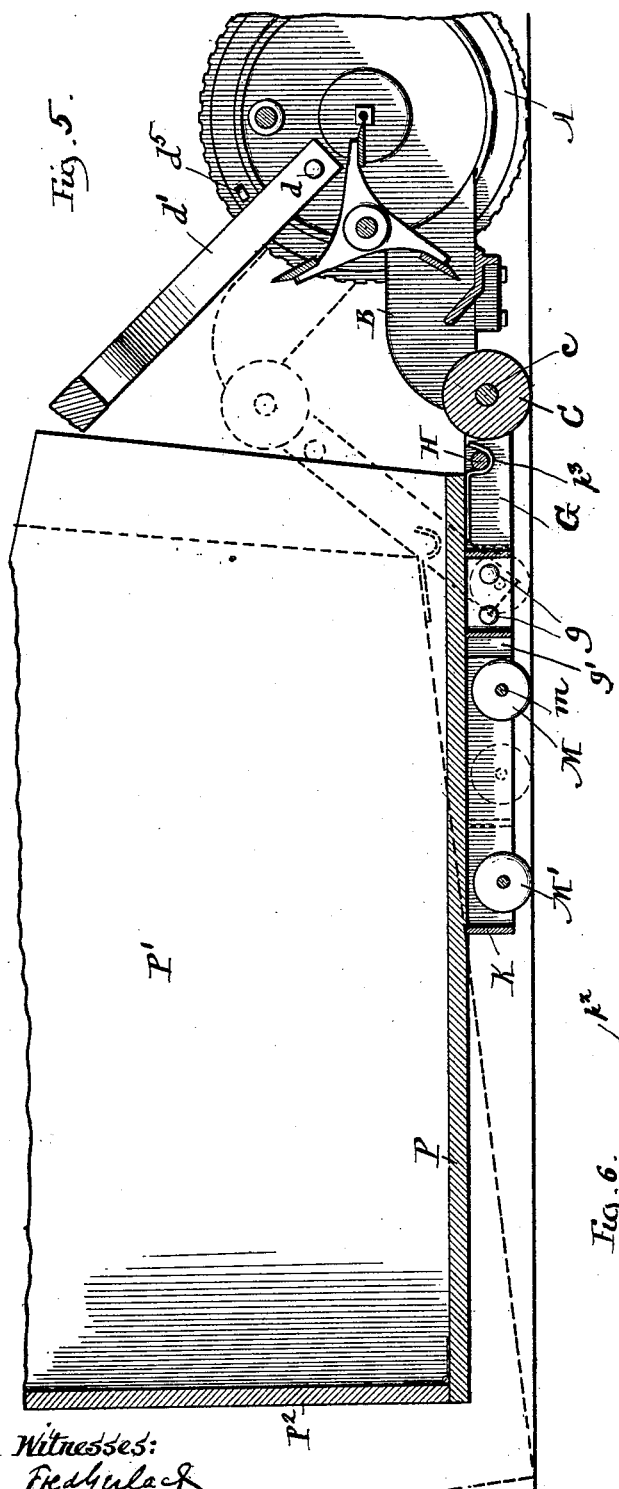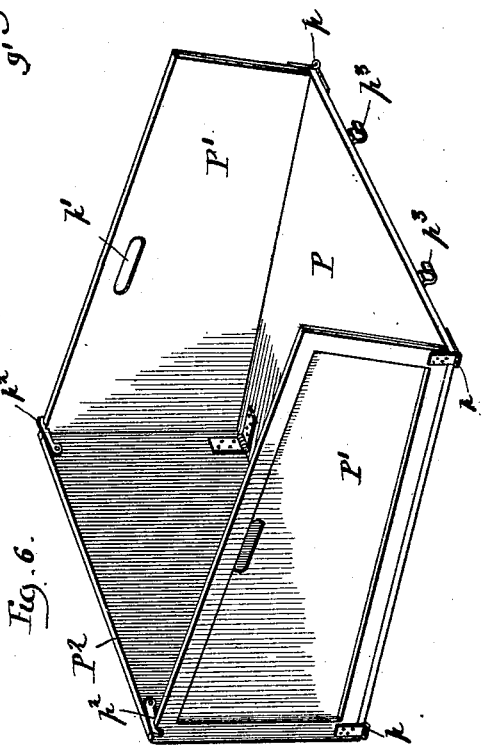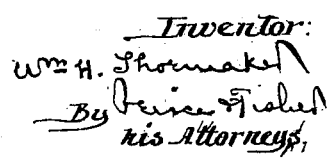

UNITED STATES PATENT OFFICE.

WILLIAM H. SHOEMAKER, OF CHICAGO, ILLINOIS.

GRASS-CATCHER FOR LAWN-MOWERS.

SPECIFICATION forming part of Letters Patent No. 680,467, dated August 13, 1901.

Application filed April 4, 1900. Serial No. 11,430. (No model.)

*To all whom it may concern:*

Be it known that I, WILLIAM H. SHOEMAKER, a resident of Chicago, Cook county, Illinois, have invented certain new and useful Improvements in Grass-Catchers for Lawn-Mowers, of which the following is a full, clear, and exact description.

This invention has for its object to provide an improved construction of grass-catcher and means for detachably connecting the same to a lawn-mower; and the invention consists in the various novel features of construction hereinafter described illustrated in the accompanying drawings, and particularly pointed out in the claims at the end of this specification.

Figure 1 is a view in side elevation of a familiar construction of lawn-mower having my invention applied thereto. Fig. 2 is an enlarged plan view showing the manner of connecting the carrier for the grass catcher or holder to the lawn-mower, the trail-wheel of the lawn-mower being also shown. Fig. 3 is a side view of that part of the carrier adjacent each end of the trail-wheel. Fig. 4 is a view in elevation of that part of the carrier-supporting frame in front of the line 4 4 of Fig. 2. Fig. 5 is an enlarged view in vertical longitudinal section through the lawn-mower, its trail-wheel, the carrier-frame, and the carrier supported thereon. Fig. 6 is a detail perspective view of the grass holder or carrier. Fig. 7 is a view of the grass holder or carrier shown in folded position.

The lawn-mower shown in the accompanying drawings is one of familiar construction, being provided with the usual drive-wheels A, journaled to the ends of the frame B, at the rear end of which frame upon an axle $c$ is journaled the trail-wheel C. To the frame B of the lawn-mower is pivotally connected, as at $d$, the yoke-shaped end $d'$ of the handle D, whereby the lawn-mower is propelled.

The support for the grass carrier or holder being more especially designed for connection with the end portions of the journals $c$ of the trail-wheel C is shown as comprising two hooks E, adapted to set over the ends of the shaft or journal $c$ and to be interlocked therewith by suitable guards E' at points between the ends of the trail-wheel C and the side frames B. Manifestly the hooks E and guards E' may be of any suitable construction; but as shown these hooks and guards are formed of plate metal, the hooks being riveted, as at $e$, to the side bars F of the carrier-frame, while the guards E' are each shown as formed at the point of a metal plate $E^2$, having a slot $e^2$, through which pass the headed pins or rivets $e^3$, that hold the guard-plates $E^2$ in engagement with the side plate F of the carrier-frame, while permitting the guard-plate to be moved back and forth in order to bring the guard beneath or away from the mouth of the corresponding hook E. One of the heads of the rivets $e$ is enlarged, as shown in Fig. 3, to serve as a guide for the sliding guard E'. Preferably the rear end of each of the guard-plates $E^2$ is bent outwardly, as at $e^4$, as this affords a convenient means for shifting the guard-plates back and forth.

By reference more particularly to Figs. 2 and 4 of the drawings it will be seen that the side plates F are adjustably connected to the central portion of the carrier-support by means of bolts $f$, that pass through slots $f'$ in the side plates F adjacent their inner ends, the bolts $f$ passing through suitable holes in the central portion of the frame. The purpose of this construction is to allow the side plates to be moved in or out and fixed at any desired position by means of the bolt $f$ in order to enable the width of the frame to be varied according to the size of lawn-mower to which the frame is to be attached. The central portion of the carrier-frame is shown as formed of bars G, the forward ends of which are bent at right angles to the trail-wheel C and are formed with holes, through which passes a cross-rod H. This cross-rod also passes through corresponding holes formed in the forwardly-extending portions of the side bars F. It will be readily understood from the foregoing description that by loosening the nuts of the bolts $f$ and by drawing out or moving inward the side bars F the carrier-frame can be made wider or narrower, according to the size of the lawn-mower to which it is to be applied. The same cross-rod H, however, may be used with the carrier-frame when adjusted to different widths, as the rod slides freely through the holes formed in the ends of the side bars F and central bars G.

By reference to Figs. 2 and 4 of the drawings it will be observed that the central bars G of the carrier-frame are riveted together, as at g, and have their rear portions bent outwardly and backwardly to form the arms g'. To these arms g' is connected a frame K, that has journaled therein the trail-rolls M and M'. The journal m of the trail-roll M serves also preferably as the pivotal connection between the arms g and the frame K.

Upon the frame K rests the bottom of the grass holder or receptacle, the preferred construction of which is that illustrated in the accompanying drawings. As shown, this holder is of "knockdown" construction, so that it may be easily folded into very small compass for shipment or storage. The bottom P of the holder has connected thereto by suitable hinges p the sides P' and the rear end $P^2$, the sides P' being preferably provided with hand-holes p', whereby the holder or receptacle may be conveniently carried. In order to lock the sides P' and end $P^2$ in upright position, as shown in Fig. 6, I prefer to employ hooks $p^2$, that are pivoted to the end $P^2$ and are adapted to latch over the upper edges of the sides P'. Manifestly, however, any other convenient means may be employed for temporarily locking the sides and end together when in position for use. The front edge of the bottom P of the grass holder or receptacle is provided with suitable hooks $p^3$, turned upward and adapted to engage the cross-rod H, that extends at the rear of the trail-wheel C, and when the grass holder or receptacle is in position for use the hooks $p^3$ will pass beneath and engage the cross-rod H, as clearly shown in Fig. 5. When in this position, the holder will receive the grass as it is thrown rearwardly by the revolving knives of the lawn-mower as the latter is pushed forward by the handle D. When the grass holder or receptacle has been filled, the operator can readily detach it by turning the handle D of the mower forward until it contacts with the stops $d^5$ on the side of the frame B, thereby lifting the frame, the trail-roll C, and the cross-rod H, &c., until the cross-rod is lifted from engagement with the hooks $p^3$ at the front of the grass holder or receptacle. At such time the parts will occupy the position shown by dotted lines in Fig. 5, and as the rear end of the receptacle rests upon the ground the further movement of the lawn-mower will cause the frame K to pass from beneath the receptacle, which may be thereafter moved at the operator's convenience, or, if desired, the operator may remove the grass holder or receptacle by simply tipping up its rear end and depressing its front end until the release $p^3$ can be cleared from the rod H. It will be readily seen by reference to Figs. 6 and 7 that when the grass holder or receptacle is to be packed for shipment or storage the sides P' will be turned beneath the bottom P and the end $P^2$ will be folded on top of the bottom P, as seen in Fig. 7, the parts thus occupying a very small compass.

I believe that my invention possesses many points of advantage over other devices designed for similar purposes. The frame whereby the grass holder or receptacle is supported is exceedingly simple, cheap, and durable in construction and is supported at the rear of the mower in such manner that it occupies but little space and need not be removed in shifting the mower from point to point when not cutting grass. The provision for connecting to the lawn-mower the carrier-frame is so simple and effective that it can be conveniently attached or removed without any difficulty whatever, and the adjustment of the parts is such that the same frame can be instantly attached by unskilled labor to various sizes of mowers. So also the feature of detachably connecting the grass holder or receptacle to its supporting-frame, so that it may be readily released by the mere shifting of the handle of the lawn-mower, is a feature of advantage since it renders the disengagement of the grass holder or receptacle from its sustaining-frame practically automatic. By providing a removable grass holder or receptacle the operator is enabled to instantly carry away and discharge the grass in most convenient manner and, if desired, several holders or receptacles may be used in connection with the same sustaining-frame. The fact that my improved grass-catcher is not suspended from the handle of the mower I regard as a feature of advantage, as in my construction the weight of the grass and of the holder or receptacle is not thrown upon the arms of the operator, but is supported by a frame that travels at the rear of the mower with the least possible friction upon the ground.

While I have described what I regard as the preferred form of my invention, it is manifest that the precise details of construction above set out may be varied without departing from the spirit of the invention and may be employed without its adoption as an entirety.

Having thus described my invention, what I claim as new, and desire to secure by Letters Patent, is—

1. A grass-catcher for lawn-mowers, comprising a rigid frame, a grass holder or receptacle attached thereto, and hooks mounted on said rigid frame and laterally adjustable with reference to said frame for engaging the journals of the trail-wheel of the lawn-mower.

2. A grass-catcher for lawn-mowers, comprising a rigid frame, a grass holder or receptacle attached thereto, hooks detachably mounted on said rigid frame and laterally adjustable with reference thereto for engaging the journals of the trail-wheel of a lawn-mower, and means for rigidly securing said hooks to said frame in various adjusted positions.

3. A grass-catcher for lawn-mowers, comprising a frame, a grass-holder or receptacle attached thereto, hooks mounted on said frame for engaging the journal of the trail-wheel of the lawn-mower, guards for holding said hooks in engagement with said journals, said guards permanently but movably secured to said frame by a slot-and-pin connection and handpieces on said guards for shifting the same.

4. A grass-catcher for lawn-mowers, comprising a frame having one or more supporting-rollers, an independent grass holder or receptacle removably supported on said frame and extending rearwardly beyond the same, and upturned hooks provided on the forward end of said grass holder or receptacle for detachably engaging a portion of said frame.

5. A grass-catcher for lawn-mowers, comprising a frame having front and rear transverse portions, and an independent grass holder or receptacle removably supported on said rear portion and having one or more forwardly-projecting upturned hooks for detachably engaging said front portion of the frame.

6. A grass-catcher for lawn-mowers comprising a frame having adjustable end bars provided with means for connecting it to the lawn-mower, the rear part of said frame having a rigid and a hinged section each provided with a supporting wheel or roller.

7. A grass-catcher for lawn-mowers, comprising a frame, means for connecting it to a lawn-mower, and having at its rear a short pivoted portion provided with a supporting-roller, a grass holder or receptacle supported on said frame and said pivoted portion and extending rearwardly beyond the latter, and hooks provided at the forward end of said receptacle for detachably engaging said frame.

8. In a grass-catcher for lawn-mowers, the combination with a frame provided with hooks for detachably securing said frame to the trail-wheel of a lawn-mower, of an independent grass holder or receptacle removably supported on said frame, said receptacle having a bottom arranged to rest on said frame, sides and end secured to said bottom and foldable thereon, and hooks for detachably securing said receptacle to said frame, substantially as described.

WILLIAM H. SHOEMAKER.

Witnesses:
GEO. P. FISHER, Jr.,
ALBERTO ADAMICK.